(12) United States Patent
Guivarc'h et al.

(10) Patent No.: US 7,011,342 B2
(45) Date of Patent: Mar. 14, 2006

(54) CONNECTING DEVICE COMPRISING MEANS FOR INSTANTANEOUS CONNECTION OF A PIPE END TO A MEMBER AND MEANS FOR PROTECTING THE CONNECTION

(75) Inventors: Olivier Guivarc'h, Rennes (FR); Frédéric Goilot, Rennes (FR); Jean-Luc Quere, Bruz (FR)

(73) Assignee: Legris SA, Rennes (FR)

( * ) Notice: Subject to any disclaimer, the term of this patent is extended or adjusted under 35 U.S.C. 154(b) by 79 days.

(21) Appl. No.: 10/381,475

(22) PCT Filed: Oct. 24, 2001

(86) PCT No.: PCT/FR01/03299

§ 371 (c)(1),
(2), (4) Date: Mar. 26, 2003

(87) PCT Pub. No.: WO02/35134

PCT Pub. Date: May 2, 2002

(65) Prior Publication Data

US 2004/0036285 A1 Feb. 26, 2004

(30) Foreign Application Priority Data

Oct. 26, 2000 (FR) .............................................. 00 13717
Feb. 21, 2001 (FR) .............................................. 01 02316

(51) Int. Cl.
*F16L 13/04* (2006.01)

(52) U.S. Cl. ....................................... 285/116; 285/114
(58) Field of Classification Search ................. 285/340, 285/39, 45, 81, 82, 114, 115, 116, 319; 138/110
See application file for complete search history.

(56) References Cited

U.S. PATENT DOCUMENTS

| 4,573,716 | A |   | 3/1986  | Guest                  |
|-----------|---|---|---------|------------------------|
| 4,919,457 | A | * | 4/1990  | Moretti ........... 285/39 |
| 5,174,611 | A | * | 12/1992 | Byrd et al. ....... 285/45 |
| 5,468,027 | A | * | 11/1995 | Guest ............ 285/319 |
| 5,816,622 | A | * | 10/1998 | Carter ............ 285/45 |

FOREIGN PATENT DOCUMENTS

| EP | 0146997 A1 * | 7/1985 |
| EP | 0555981 A1 * | 8/1993 |
| FR | 2 591 309    | 6/1987 |
| FR | 2 790 056    | 8/2000 |
| GB | 2 040 014    | 8/1980 |
| GB | 2 122 714    | 1/1984 |

* cited by examiner

*Primary Examiner*—Aaron Dunwoody
(74) *Attorney, Agent, or Firm*—Young & Thompson

(57) ABSTRACT

A device for coupling an end of a hose to a member, comprises a body provided with an internal channel opening out into a chamber having quick-connection elements for connecting the end of the hose to the channel. The quick-connection elements comprise a washer with teeth disposed in the chamber and associated with a tubular disconnection pusher which is mounted to slide inside the chamber and which possesses a drive end projecting outside the body, and an opposite end for lifting the teeth. The device comprises protection elements for protecting the connection, which include a sleeve (18) possessing axially in succession: a connection portion (19) for connection to the body extending around the drive end; and a hose guide portion (20) which is secured to the connection portion via an end opposite from the body and which extends beyond the drive end coaxially with the internal channel.

9 Claims, 3 Drawing Sheets

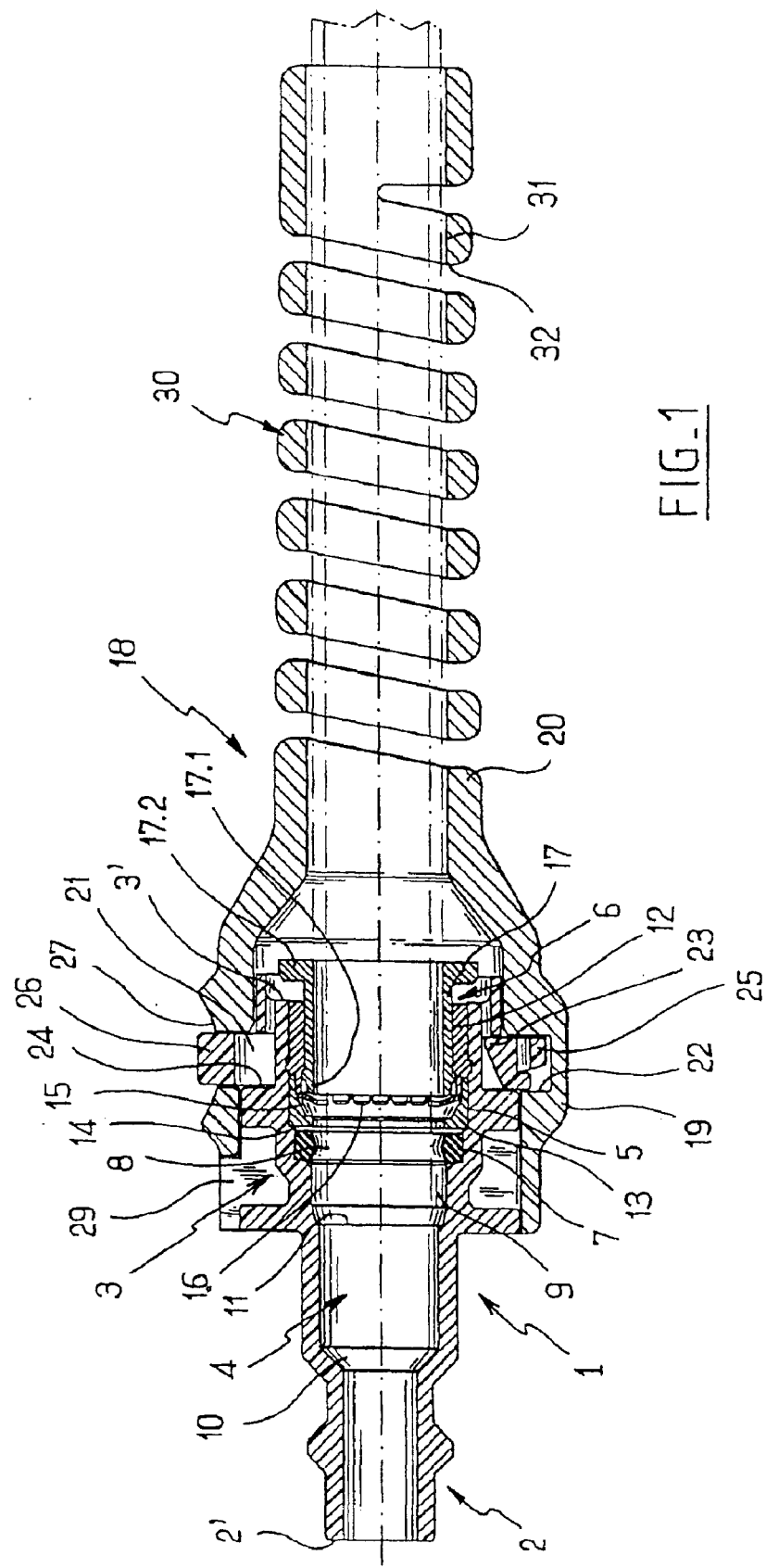
FIG_1

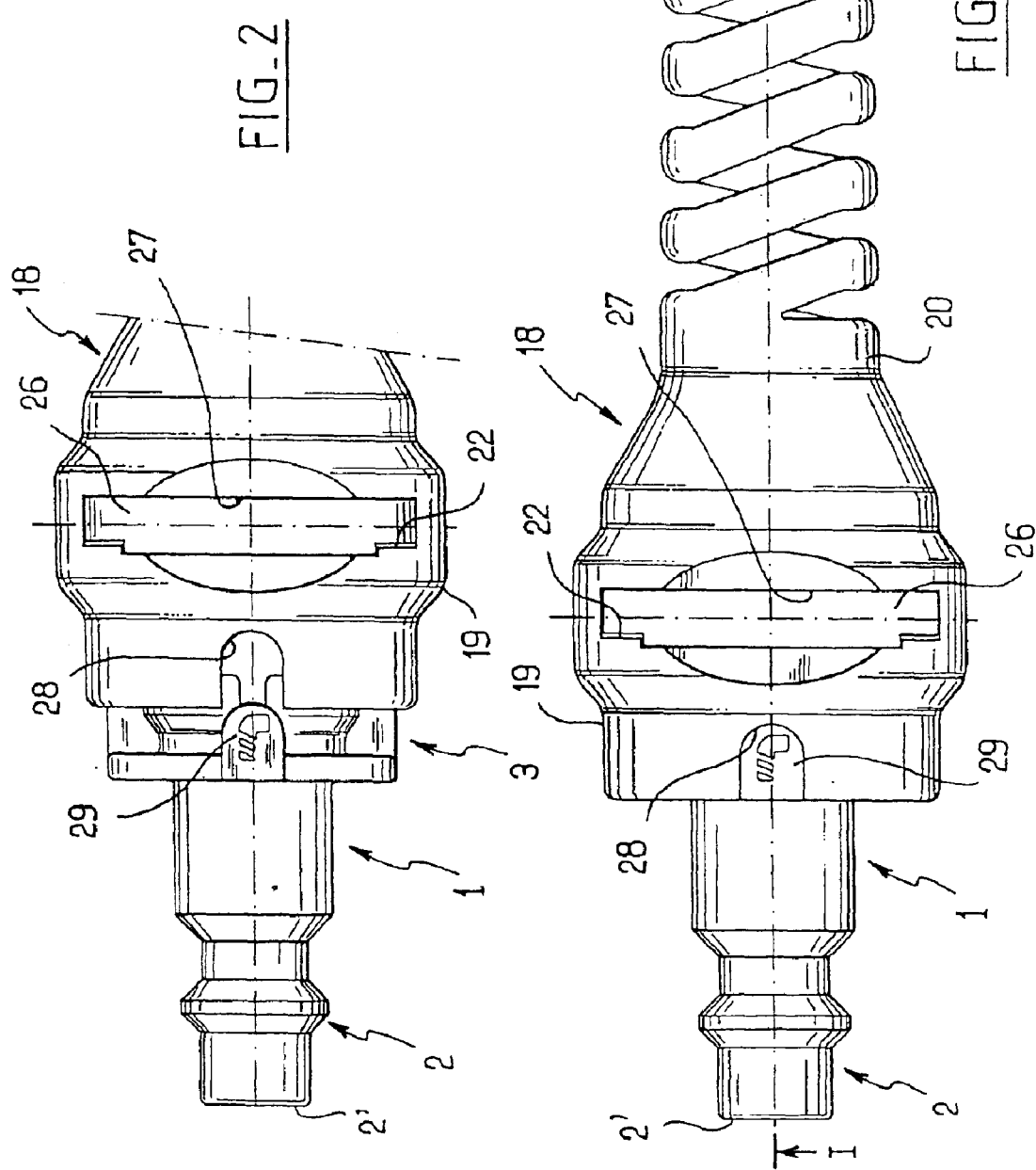

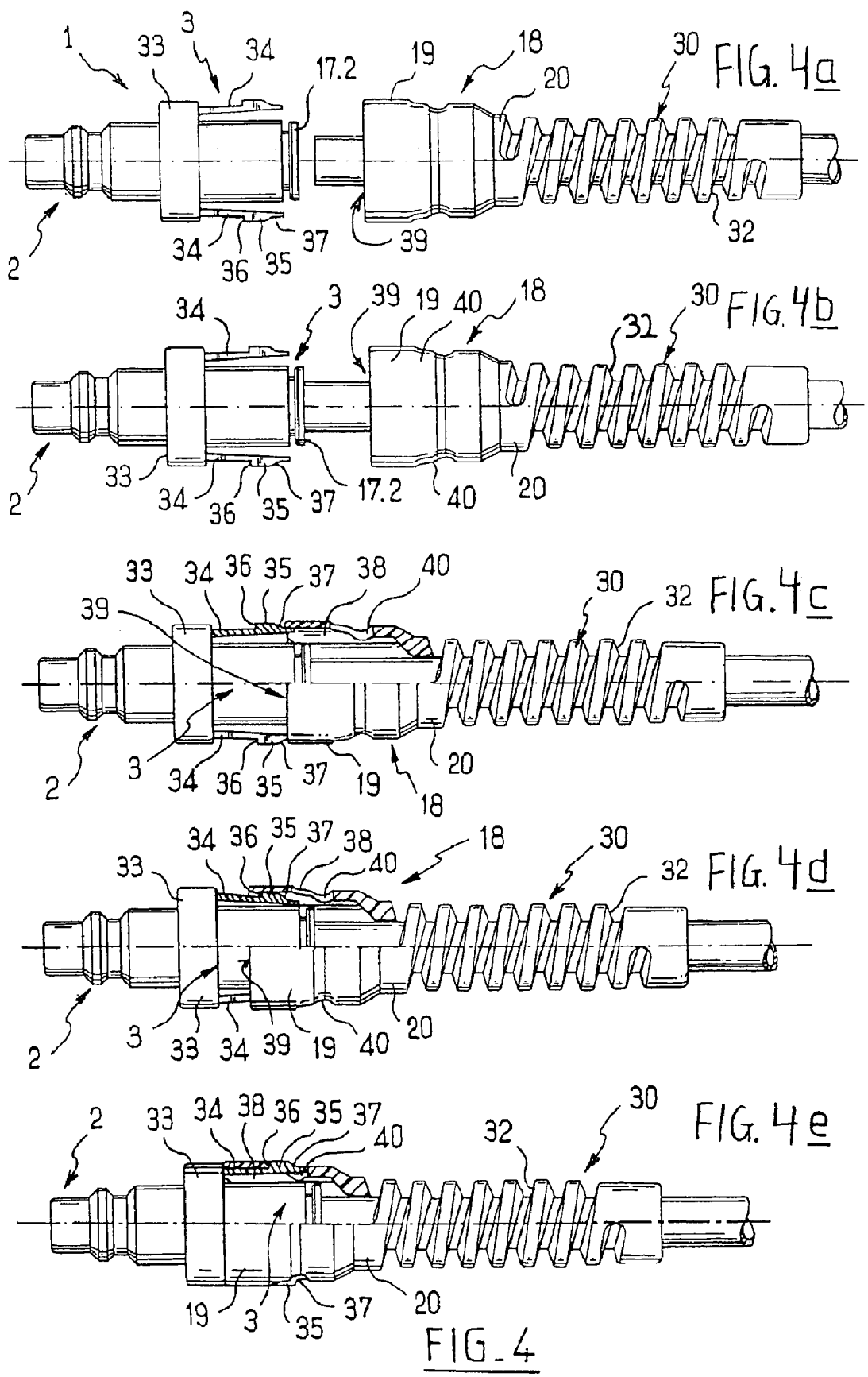

CONNECTING DEVICE COMPRISING MEANS FOR INSTANTANEOUS CONNECTION OF A PIPE END TO A MEMBER AND MEANS FOR PROTECTING THE CONNECTION

The present invention relates to a coupling device comprising quick connection means for coupling an end of a hose to a member.

BACKGROUND OF THE INVENTION

Connection devices incorporating such connection means are generally used in circuits for transporting fluids, in particular for coupling one hose to another hose, or to a fluid-emitting element such as a pump, or to a fluid-receiving element such as a tank.

A connection device of known type generally comprises a body provided with an internal channel opening out into a chamber for receiving one end of the hose, a sealing O-ring, and means for retaining said end of the hose.

By way of example, the retaining means comprise an elastically deformable washer possessing an inside circumference of diameter smaller than an outside diameter of the hose, and it is subdivided into a plurality of teeth, together with an outer portion which is received in a groove formed in the chamber. While the end of the hose is being inserted, the teeth flex upwards so as to allow the hose to pass through, and under the effect of the elasticity of the material constituting the washer, the free ends of the teeth then press against the outer surface of the hose so as to bite into it when a traction force is exerted on the hose.

The connection device generally comprises disconnection means in the form of a pusher slidably received in the chamber, the pusher having one end shaped to be interposed between the teeth and the hose so as to spread the teeth away from the hose, and an opposite end constituting a handle which projects outside the chamber. In the event that parts in the surroundings of the coupling device push against the pusher during relative displacement between said parts and the device, or in the event of the hose bending, there is a risk that said parts or that the bending of the hose might cause the pusher to be pushed in, thereby accidentally disconnecting the end of the hose.

In addition, when a hose connected to such a connection device is subjected to a force that causes the end of the hose to bend in the vicinity of the connection device, the bending tends to cause the end of the hose to become transformed transversely, and more precisely for it to become ovalized. Such ovalization degrades the quality of contact between the outside surface of the end of the hose and the inside surface of the sealing ring, which runs the risk of giving rise to leaks. Major deformation also runs the risk of causing the hose to kink in the vicinity of the coupling since it is more rigid than the hose.

OBJECTS AND SUMMARY OF THE INVENTION

The invention provides a sleeve for protecting the connection, which sleeve comprises in axially consecutive manner: a portion for connection to the body extending axially so as to project from the body around the drive end of the pusher; a hose guide portion which is secured to the connection portion via an end opposite from the body and which extends beyond the drive end of the pusher coaxially with the internal channel; and a tubular portion for supporting the hose, extending the guide portion away from the connection portion.

Thus, the sleeve surrounds the handle end of the pusher and prevents it being pushed in accidentally. In addition, the guide portion of the sleeve prevents the hose from bending in the vicinity of the body and the quick-connection means. In addition, the guide portion may be arranged to present an inside diameter that is substantially equal to the outside diameter of the end of the hose in such a manner as to further limit any possibility of the end of the hose being deformed transversely. When a bending force is exerted on the end of the hose beyond the guide portion, the support portion tends to limit the curvature of the hose under the effect of said force. This makes it possible to limit the risks of the end of the hose kinking due to it being bent excessively. Any risk of accidental disconnection and possible ovalization is thus limited while preserving fluid flow characteristics.

In a particular embodiment, the connection portion has fastening means for releasably fastening it to the body.

It is then easy to access the body and the quick-connection means, merely by withdrawing the sleeve.

Preferably, in this embodiment, the fastening means comprise a ring mounted to slide transversely in the connection portion between a locked position in which the ring is biased resiliently so as to be off-center relative to the axis of the connection portion, thereby presenting a portion projecting into the sleeve to cooperate with a corresponding portion in relief on the body, and an unlocked position in which the ring is coaxial with the connection portion so as to disengage the portion in relief, the resilient bias being advantageously performed by means of elastically deformable tabs each having one end secured to the outside surface of the ring and an opposite end that is free, bearing against a wall of the connection portion of the sleeve.

In a variant, the fastening means comprise at least one spring blade which is deformable between a first state in which it is biased resiliently and a second state, the spring blade extending longitudinally outside the body and having one end secured to the body and an opposite end that is free provided with a catch for being inserted into the sleeve and for co-operating, when the sleeve is fastened to the body, with a hole formed transversely through the sleeve in such a manner that when the spring blade is in its first state its free end is moved away from the body and the catch projects into the hole, and when the spring blade is in its second state, the free end is moved towards the body and the catch is disengaged from the hole, the fastening means preferably comprising two spring blades extending parallel along the body on opposite sides to each other so as to co-operate with two corresponding holes of the sleeve.

These techniques for fastening the sleeve to the body are simple and well adapted to the stresses to which the bending-limiting means are subjected in use, in particular concerning the strength of the fastening means and the ease with which they can be manipulated.

BRIEF DESCRIPTION OF THE DRAWINGS

Other characteristics and advantages of the invention appear on reading the following description of a particular, non-limiting embodiment of the invention.

Reference is made to the accompanying drawings, in which:

FIG. 1 is a longitudinal section view on line I—I of FIG. 3, showing a coupling provided with a protective sleeve in accordance with the invention;

FIG. 2 is a fragmentary elevation view of a protective sleeve at the moment of fixing to the coupling;

FIG. 3 is an elevation view of the coupling fitted with a protective sleeve; and FIGS. 4a to 4e are elevation views showing stages in a coupling operation with a coupling in a variant embodiment of the invention.

DETAILED DESCRIPTION OF THE INVENTION

With reference to FIGS. 1 to 3, the coupling device of the invention comprises a body, given overall reference 1, the body being tubular in shape and axially subdivided into a male portion given overall reference 2 that is designed, for example, to be inserted into a channel of a fluid emitter or receiver member (not shown), and a female portion given overall reference 3 and designed to receive one end of a hose, in this case represented by chain-dotted lines. The coupling could equally well be made in the form of a female portion 3 that is integral with said member.

A stepped bore given overall reference 4 extends axially inside the body 1. The stepped bore 4 is subdivided axially from the free end 3' of the female portion 3 to the free end 2' of the male portion 2 into a portion of large diameter 5 for receiving quick-connection means 6, the portion of smaller diameter 7 receiving an O-ring 8, a guide portion 9 having a diameter that is substantially equal to the outside diameter of the end of the hose, and a stepped portion 10 having a portion of smaller diameter extending beside the free end of the male portion and providing communication between the stepped bore portion 4 that receives the end of the hose and the channel of the member connected to the male portion 2.

Between the portions 9 and 10 of the stepped bore, a shoulder 11 constitutes an abutment against the end of the hose being pushed into the coupling. In a particular embodiment, the guide portion 9 may be slightly conical, its small base facing towards the stepped portion 10 so as to create a small amount of compression in the wall at the end of the hose as it penetrates into the guide portion.

In conventional manner, the connection means 6 comprise a two-part insert 12, 13, which parts are inserted and held by force inside the body in conventional manner. The part 12 is adjacent to the free end 3' of the female portion 3, while the part 13 adjacent to the portion 7 comes into abutment against the shoulder 14 between the two portions 5 and 7 of the stepped bore 4, and projects from said portion 7 so as to form an axial abutment for the sealing ring 8.

The two parts 12 and 13 define a groove 15 between them which constitutes a housing for a washer 16 provided with teeth for catching and retaining the end of the hose.

A tubular disconnection pusher 17 is mounted to slide in the part 12 of the insert between a pushed-in position where the pusher has an end 17.1 that lifts the teeth of the washer, and a withdrawn position in which said end 17.1 is spaced apart from the teeth (position shown in FIG. 1). The opposite end 17.2 of the pusher 17 projects from the free end 3' of the female portion 3.

The coupling device has protective means comprising a sleeve given overall reference 18 and comprising axially in succession: a portion 19 for connection to the body 1; and a portion 20 for guiding the end of the hose. The connection portion 19 and the guide portion 20 are interconnected in this case via a frustoconical portion. The sleeve 18 is made by injection molding a thermoplastic material that is more rigid than the hose.

The connection portion 19 has an inside diameter that is greater than the outside diameter of the female portion 3 of the body 1, and it has a ring 21 likewise of inside diameter greater than the outside diameter of the female portion 3, that is mounted in a housing 22 formed inside the connection portion 19 to slide radially between a locked position (as shown in FIG. 1) in which it is off-center relative to the central axis of the connection portion 19, and an unlocked position in which the ring 21 is substantially coaxial with the connection portion 19. In the locked position, the ring 21 thus presents an internal portion 23 which projects into the connection portion 19. The internal portion 23 of the ring 21 has a chamfered surface opposite from the guide portion 20 and is designed to be received in an outside groove 24 of the female portion 3 of the body 1. The ring 21 is biased towards its locked position by resilient curved tabs 25 each having one end secured to the outer periphery of the ring 21 and an opposite end that is free and that bears against the bottom of the housing 22. In the locked position, the ring 21 presents, at an end remote from the internal portion 23, an external drive portion 26 projecting outside the female portion 3 via an opening 27 through which the housing 22 opens out to the outside surface of the female portion 3.

A notch 28 is formed in the free end of the connection portion 19 to receive a stud 29 secured to the female portion 3 of the body 1 so as to form an abutment against rotation.

The inside diameter of the guide portion 20 is substantially equal to the outside diameter of the end of the hose and it extends at a distance from the ring 21 that is greater than the distance between the groove 24 and the end 17.2 of the pusher 17 when in the withdrawn position.

The guide portion 20 is extended by a portion 30 supporting the end of the hose. This support portion 30 comprises a cylindrical wall 31 which defines an inside diameter substantially equal to the outside diameter of the end of the hose and it has a slot 32 passing through it, which slot extends helically along the support portion 30, thereby imparting a degree of flexibility thereto.

Prior to putting the sleeve 18 into place on the body 1, the sleeve 18 is engaged on the end of the hose by inserting the hose into the support portion 30 of the sleeve.

The end of the hose is then connected to the body in conventional manner by inserting the hose into the female portion 3 until it comes into abutment against the shoulder 11.

The connection portion 19 of the sleeve 18 is then put into place on the female portion 3. While this is taking place, the chamfered surface of the inner portion 23 of the ring 21 comes into contact with the end 3' and forms a ramp for realigning the axis of the ring 21 with the axis of the connection portion 19 which coincides with the axis of the female portion 3. The ring 21 can then move towards its unlocked position against resilient tabs 25 until the ring 21 comes into register with the groove 24. The tabs 25 then relax and move the ring 21 into its locked position. The inner portion 23 then extends in the groove 24 whose flank adjacent to the male portion 2 constitutes an abutment against engagement of the connection portion 19, and the flank adjacent to the end 3' constitutes an abutment against extraction of the connection portion 19.

The connection portion 19 is oriented relative to the coupling 1 in such a manner that the stud 29 is received in the notch 28 and prevents the connection portion 19 from turning relative to the coupling 1.

Once the sleeve 18 has been mounted on the female portion 3 of the coupling 1, the end of the connection portion 19 secured to the guide portion 20 extends beyond the actuation end 17.2 of the pusher 17. As a result, the sleeve forms a protective cap around the actuation end of the disconnection pusher and prevents the pusher being pushed in accidentally. Furthermore, the guide portion 20 opposes bending of the end portion of the hose which extends between the female portion 3 and the guide portion 20, while the support portion 30 allows a limited amount of bending of the portion of hose that it receives (i.e. the support portion tends to stiffen this portion of the hose). In addition, the guide portion 20 opposes any transverse deformation of the end portion of the hose extending between the female portion 3 and the guide portion 20.

It should be observed that it is also possible to mount the sleeve 18 on the female portion 3, and then only later to insert the end of the hose in the sleeve 18 and the female portion 3.

The sleeve is withdrawn by pushing in the ring 21 so as to release the inner portion 23 of the groove 24, and then by pulling on the sleeve. The end 17.2 of the pusher 17 is then accessible so that the pusher 17 can be pushed in to allow the end 17.1 to move the teeth of the washer 16 away from the hose, thereby releasing the end of the hose so that it can be pulled out from the female portion 3.

Elements which are identical or analogous to those described above are given identical reference numerals in the following description of a variant embodiment shown in FIGS. 4a to 4e.

In this variant, the modifications relate mainly to the way in which the connection portion 19 is fastened to the body 1.

An annular sleeve 33 extends between the male portion 2 and the female portion 3 so as to form an abutment against the female portion 3 being pushed into the sleeve 18.

Two spring blades 34 extend parallel to each other from the shoulder 33 along the female portion 3, on the outside thereof. The spring blades 34 are disposed opposite one another about the female portion 3.

Each spring blade 34 possesses one end secured to the shoulder 33 and an opposite end that is free, said opposite end being provided with a catch 35 facing away from the body 1 and possessing at one end an abutment surface 36 facing the shoulder 33 and at its opposite end a ramp 37. Each spring blade 34 is deformable between a rest state in which its free end is spaced apart from the outside surface of the female portion 3, and a deformed state in which the free end is adjacent to the outside surface of the female portion 3.

On its inside the connection portion 19 presents two longitudinal grooves 38 for slidably receiving the spring blades 34. Each groove 38 has one end opening out to the end face 39 of the free end of the connection portion 19, and an opposite end opening out into a hole 40 extending transversely through the connection portion 19 in order to receive the catch 35.

The end of the hose is connected as before to the female portion 3 after engaging the sleeve 18 on the end of the hose (FIGS. 4a and 4b).

The connection portion 19 of the sleeve 18 is then moved onto the female portion 3. The ramps 37 of the spring blades 34 in the rest state come into contact with the edges of the grooves 38 (FIG. 4c) at their end faces 39, and by sliding over said edges they bring the spring blades 34 into their deformed state as the female portion 3 penetrates into the connection portion 19 (FIG. 4d).

The co-operation between the catch 35 and the bottom of the groove 38 maintains the spring blade 34 in its deformed state while the movement of inserting the female portion 3 into the sleeve 18 continues.

When the end face 39 comes into abutment against the shoulder 33, the catches 35 extend in register with the holes 40 so that the spring blades 34 return elastically to the rest state. The catches are then engaged in the holes 40 and their abutment surfaces 36 oppose extraction of the sleeve 18, while the spring blades 34 and the catches 35 also oppose any turning of the sleeve 18 relative to the body 1.

The sleeve 18 is disassembled by moving the spring blades 34 into their deformed state by exerting pressure on the catches 35 through the holes 40, while also exerting an extraction force on the sleeve 18.

Naturally, the invention is not limited to the embodiment described, and variant embodiments can be applied thereto without going beyond the ambit of the invention as defined by the claims.

In particular, the support portion may also be made of a material that is less rigid than the material used for making the remainder of the sleeve.

Furthermore, the connection portion may be fixed permanently to the coupling (the disconnection pusher of the coupling then being accessible through an opening provided in the sleeve), or the connection portion may be associated with the coupling by releasable fixing means. The fastening means may also be of a structure that is different from those described, for example as deduced by inverting the movements of the parts described.

Furthermore, the invention is applicable to any type of coupling having quick-connection means associated with a disconnection member.

What is claimed is:

1. A device for coupling an end of a hose to a member, the device comprising a body provided with an internal channel opening out into a chamber having quick-connection means for connecting the end of the hose to the channel, the quick-connection means comprising a washer with teeth disposed in the chamber and associated with a tubular disconnection pusher which is mounted to slide inside the chamber and which possesses a drive end projecting outside the body, and an opposite end for lifting the teeth, the device comprising a sleeve for protecting the connection, which sleeve comprises in axially consecutive manner:

a portion for connection to the body which is axially in abutment against the body for preventing engagement of the connection portion and which extends axially so as to project from the body around the drive end of the pusher;

a hose guide portion which is secured to the connection portion via an end opposite from the body and which extends beyond the drive end of the pusher coaxially with the internal channel; and a tubular portion for supporting the hose, extending the guide portion away from the connection portion, wherein the tubular portion for supporting the hose has a wall pierced by a slot extending helically along said tubular portion.

2. A coupling device according to claim 1, wherein the connection portion has fastening means for releasably fastening it to the body.

3. A coupling device according to claim 2, wherein the fastening means comprise a ring mounted to slide transversely in the connection portion between a locked position in which the ring is biased resiliently so as to be off-center relative to the axis of the connection portion, thereby presenting a portion projecting into the sleeve to co-operate with a corresponding portion in relief on the body, and an unlocked position in which the ring is coaxial with the connection portion so as to disengage the portion in relief.

4. A coupling device according to claim 3, wherein the resilient bias is performed by means of elastically deformable tabs each having one end secured to the outside surface of the ring and an opposite end that is free, bearing against a wall of the connection portion of the sleeve.

5. A coupling device according to claim 4, wherein the tabs are curved in shape.

6. A device for coupling an end of a hose to a member, the device comprising a body provided with an internal channel opening out into a chamber having quick-connection means for connecting the end of the hose to the channel, the quick-connection means comprising a washer with teeth disposed in the chamber and associated with a tubular disconnection pusher which is mounted to slide inside the chamber and which possesses a drive end projecting outside the body, and an opposite end for lifting the teeth, the device comprising a sleeve for protecting the connection, which sleeve comprises in axially consecutive manner:

a portion for connection to the body which is axially in abutment against the body for preventing engagement of the connection portion and which extends axially so as to project from the body around the drive end of the pusher;

a hose guide portion which is secured to the connection portion via an end opposite from the body and which extends beyond the drive end of the pusher coaxially with the internal channel; and a tubular portion for supporting the hose, extending the guide portion away from the connection portion, wherein the connection portion has fastening means for releasably fastening the connection portion to the body, said fastening means comprise at least one spring blade which is deformable between a first stage in which it is biased resiliently and a second stage, the spring blade extending longitudinally outside the body and having one end secured to the body and an opposite end that is free provided with a catch for being inserted into the sleeve and for co-operating, when the sleeve is fastened to the body, with a hole formed transversely through the sleeve in such a manner that when the spring blade is in its first state its free end is moved away from the body and the catch projects into the hole, and when the spring blade is in its second state, the free end is moved towards the body and the catch is disengaged from the hole.

7. A coupling device according to claim 6, wherein the fastening means comprise two spring blades extending parallel along the body on opposite sides to each other so as to co-operate with two corresponding holes of the sleeve.

8. A coupling device according to claim 1, wherein the sleeve for protecting the connection includes an element for preventing the connection portion from turning relative to the body about the longitudinal axis of the channel.

9. A coupling device according to claim 8, wherein the element for preventing rotation comprises a notch for co-operating with a stud projecting outwards from the body.

* * * * *